UNITED STATES PATENT OFFICE

CHARLES E. BRADLEY AND CLAUDE D. MASON, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA

RUBBER PROTECTION

No Drawing.    Application filed December 9, 1926.  Serial No. 153,721.

Our invention relates to the preserving of rubber against the deleterious effects or "aging" influences to which rubber is exposed in the ordinary conditions of use.

All soft rubber compounds, such as tires, footwear and mechanical stocks are more or less subject to aging or deterioration through the effects of oxygen and sunlight. Rubber goods stored in the dark, in contact with air gradually loose tensile strength and exhibit diminishing wearing qualities, while such goods, particularly stocks like footwear, where large proportions of surface are exposed, when subjected to sunlight develop a checked appearance on the surface, particularly when these goods are folded and exposed under strain. This surface checking on continued exposure results in deep cracks and finally extends through the entire depth of the stock, rendering the goods valueless for turning water.

A number of so called anti-oxidants have been developed for the purpose of preventing the deleterious action of oxygen on vulcanized rubber goods, and some of these products are now used commercially in rubber compounding.

A number of materials have also been used by the rubber industry to minimize the effect of sunlight. For instance, various types of varnishes are applied to the finished rubber goods for this purpose and certain ingredients are used in compounding which have a tendency to form protective coats as they come out on the surface of the stocks after vulcanization. Among these latter materials are such substances as the waxes, particularly paraffin wax.

It is important to note that the anti-oxidants which are valuable in preventing the breakdown of stocks in the dark have very little influence in preventing the sun-aging of rubber goods.

While paraffin wax is known to exert a valuable influence in preventing sun checking, it has the characteristic properties of developing a non-tacky surface on stocks with which it is mixed, which is particularly disadvantageous in the manufacturing processes where parts are cut from the stock and assembled into a finished boot or shoe by cementing and vulcanizing, as the wax interferes seriously with the adherence of the parts. It is therefore necessary to limit the amount of wax used in compounding such stocks to approximately one per cent of the crude rubber used in the compound.

We have found however, that by mixing with paraffin a wax of the character hereinafter designated as "Casper" wax, a superior product for preventing sun checking and aging or deterioration of rubber goods is obtained and that a much larger percentage of this non-aging ingredient may be used in the rubber than when paraffin alone is used. Moreover, unlike the paraffin alone, it preserves the tacky surface condition of the rubber stocks which is highly desirable in many manufacturing processes where rubber parts are assembled in the completed article by cementing and vulcanizing.

The principal objects of our invention are to prevent aging or deterioration of vulcanized rubber goods; to provide a protecting material or ingredient for rubber which does not impair the desirable characteristic of the rubber such as the tacky surface condition which is so important in manufacturing many articles of rubber; to provide a material of this character which may be used as an ingredient in compounding the rubber or as a coating after the rubber is vulcanized; to avoid the sun checking of rubber; to preserve the wax content in rubber when it is vulcanized in an assembly with fabric or the like; and in general, to provide an anti-aging material for rubber which is highly efficient and improves the condition of the rubber for use in making up articles therefrom.

Paraffin, as before indicated, has a beneficial effect in preventing the aging or sun checking of rubber, but it does not fully serve the desired purpose. Moreover, when mixed with the rubber in the usual manner a bloom or coming to the surface of the paraffin occurs which counteracts or impairs the usual tacky surface condition of unvulcanized rubber, and this is very undesirable in many cases, as the tacky condition serves in the manufacture of rubber articles, such for example as footwear, to facilitate the adherence or cementing together of rubber parts which are assembled to make up the completed article.

To overcome these objectionable characteristics of paraffin, we mix with the paraffin another wax, designated herein as "Casper" wax, which not only preserves the tacky surface condition of the unvulcanized rubber composition which is desired in many lines of rubber manufacture, but the mixture of Casper wax with the paraffin gives to the rubber product age resisting properties far superior to those obtained by using paraffin alone or any other known anti-aging materials.

The Casper wax which we have found particularly suitable for use with paraffin is a mineral wax made from crude petroleum of the character found in the Casper, Wyoming fields, which said wax, while made or produced from the petroleum in the same manner as ordinary petroleum, is yellowish in color, of a hardness of 100 as compared to hardness 85 of paraffin, is comparatively inert to rubber, and in other respects differs from ordinary paraffin as indicated in the following comparative table:

|  | Paraffin wax | Casper wax |
| --- | --- | --- |
| Specific gravity | 0.907 | 0.933 |
| Melting point | 120–140° F | 160–166° F. |
| Tack | Little | Pronounced. |
| Structure | Crystalline | Amorphous. |
| Solubility in organic solvents at room temperature. | Quite soluble | Slightly soluble. |
| Softening effect on rubber at 212° F. | Pronounced | Little. |

This wax, although of great benefit in connection with paraffin to produce an anti-aging material for vulcanized rubber far superior to paraffin alone, has the peculiarity that when used alone in the rubber compound it is inferior to paraffin as an anti-aging medium. When, however, the two waxes are mixed together an ingredient results which is highly effective to resist aging of rubber and renders the rubber when vulcanized, inert to sunlight. Experiment has shown that rubber compounded with the paraffin and Casper wax mixture and exposed to sunlight under the same conditions and for the same length of time as rubber with paraffin wax alone and with Casper wax alone showed no trace or indication of aging or sun checking, but retained its original fine and perfect condition, while the rubber with paraffin became quite deeply sun checked and the rubber with Casper wax was even more seriously damaged by the exposure.

Moreover, the rubber containing the paraffin and Casper wax composition retained the tacky surface condition which is so desirable in unvulcanized rubber to facilitate the making of rubber goods therefrom.

Paraffin and Casper waxes combine readily in all proportions by melting the waxes together, and without subsequent separation taking place on cooling. In preparing and using this wax mixture we prefer to melt the waxes together in the desired proportion and use this mixture in either the solid or melted form as a regular rubber compounding ingredient. We have found that mixtures of these waxes containing from 25% to 75% of Casper wax give good sun resisting qualities to vulcanized rubber goods and the mixture may be used in quantities as great as 4% or as little as 1% of the crude rubber used in the compound. The paraffin and Casper wax mixture is preferably incorporated in the rubber in milling or compounding same before the vulcanization processes, but we may also utilize this mixture and obtain desired sun-aging resistance by applying a solution of the wax mixture in gasoline or other volatile solvent to the surfaces of the goods after vulcanization.

In using waxes in rubber compounds, as for example in boots and overshoes, wherein the rubber is assembled in contact with fabric or like absorbent materials and thereafter vulcanized in the assembled form, we have found that the fabric or other similar material that is used absorbs some of the wax of the rubber compound, thereby impoverishing the compound and defeating to some extent the purpose for which the wax is used in the compound. In order to avoid this undesirable absorption and maintain the original proportions of the compound, we saturate the coating of rubber compound or gum which is run on the fabric and known as lining gum with a sufficient quantity of the wax prior to assembling or vulcanizing, so that its capability of absorbing wax from the contiguous outer rubber compound is neutralized and the proportion of wax in the outer rubber compound is thus unaffected in the vulcanizing process.

While we have shown and described our invention in a preferred form, we are aware that various changes and modifications may be made without departing from the principles of our invention, the scope of which is to be determined by the appended claims.

We claim as our invention:

1. The method of preserving rubber which comprises applying paraffin and a mineral wax having substantially the specified Casper wax characteristics, to the rubber.

2. The method of preserving rubber which comprises compounding the rubber with paraffin and a mineral wax having substantially the specified Casper wax characteristics.

3. The method of preserving rubber which comprises compounding the rubber with a quantity of combined paraffin and a mineral wax having substantially the specified Casper wax characteristics which amounts to from one to four per cent of the rubber in the compound.

4. The method of preserving rubber which comprises mixing together paraffin and a mineral wax having substantially the specified Casper wax characteristics in the proportion of from 25% to 75% of the latter wax and then mixing from 1% to 4% of the wax composition with the rubber compound.

5. A vulcanized rubber product having combined therewith a mixture of paraffin and a mineral wax having substantially the specified Casper wax characteristics to resist the aging effect of sunlight on the rubber.

6. A rubber product the rubber content of which is compounded with from 1% to 4% of wax made from a mixture of paraffin and another mineral wax having substantially the specified Casper wax characteristics and said mixture having a melting point between 140° and 155° Fahrenheit and a density between .91 and .93 at 60° Fahrenheit.

CHARLES E. BRADLEY.
CLAUDE D. MASON.